United States Patent Office.

FRANK H. HARMAN, OF HOLTON, KANSAS.

INSECTICIDE-WASH.

SPECIFICATION forming part of Letters Patent No. 325,169, dated August 25, 1885.

Application filed June 25, 1885. (No specimens.)

*To all whom it may concern:*

Be it known that I, FRANK H. HARMAN, a citizen of the United States, and a resident of Holton, in the county of Jackson and State of Kansas, have invented a certain new and useful Improved Wash for Protecting Trees; and I do hereby declare that the following is a full, clear, and exact description of the invention, which will enable others skilled in the art to which it appertains to make and use the same.

My invention has relation to a composition or wash to be used upon the trunks of fruit and other trees for the purpose of protecting the same against the bark-louse, moth, mice, and rabbits, and other destructive insects and animals; and it consists in the compound or composition adapted for such use which will be hereinafter more fully described and claimed.

To prepare this wash, I proceed as follows: Take stone-lime; slake and prepare it as for ordinary whitewash in any suitable receptacle. Take enough at a time to make a bucket about two-thirds full of a proper consistency for whitewashing. Now add one pint of gas-tar, one pound of whale-oil soap dissolved in hot water, and then add clay or loam enough to make the bucket full of the wash of proper thickness to be applied with an ordinary whitewash-brush. If whale-oil soap cannot be obtained conveniently, one pound of common soft soap or one pound of potash may be used instead, or, in the absence of both of these, one pint of strong lye made from wood ashes; but the whale-oil soap is preferable.

This wash is applied to the trunk of the tree in the same manner as ordinary whitewash, extending up a suitable distance from the ground. If the trees to be treated have had the earth ridged up around them, the earth should be removed from around the collar, and the wash applied to the body of the trees from the limbs to the ground, or down to the roots.

I have found by practical experience that this wash will effectually destroy the bark-louse and drive out all borers that may be in the trees. It also prevents the moth from depositing eggs on the trees, and gives to the trees a bright, clean, and healthy appearance. The wash should be applied in the month of May for borers and for the general benefit of the trees, and late in autumn a second coating may be applied advantageously as a preventive against mice and rabbits.

I am aware that tar and whale-oil have been used together; also, that tar and caustic alkali in solution have been used for insecticide purposes.

Having thus described my invention, I claim and desire to secure by Letters Patent of the United States—

The herein-described wash for trees, the same consisting of a mixture of slaked lime, water, gas-tar, whale-oil soap, and clay or loam, mixed in about the proportions set forth.

In testimony that I claim the foregoing as my own I have hereunto affixed my signature in presence of two witnesses.

FRANK H. HARMAN.

Witnesses:
E. D. ROSE,
J. A. HARMAN.